Patented May 11, 1926.

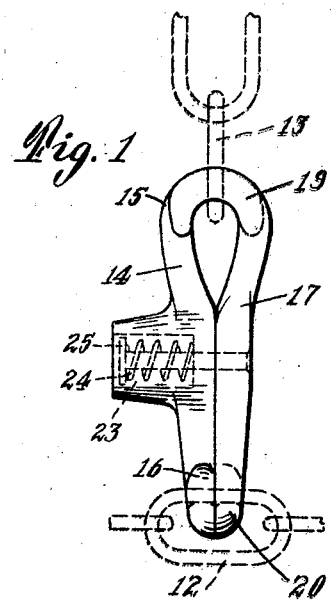
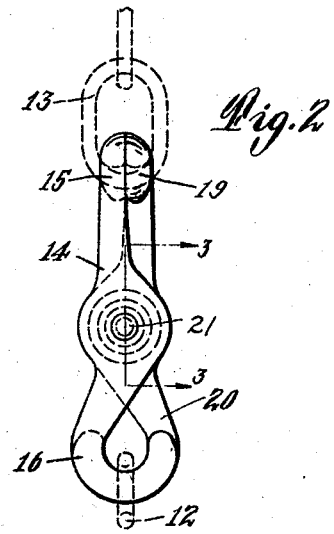
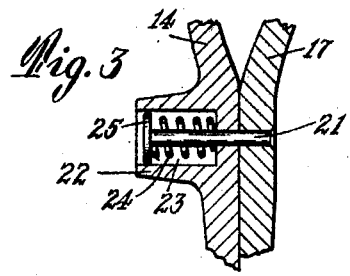
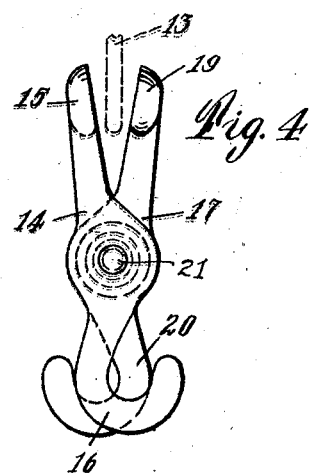
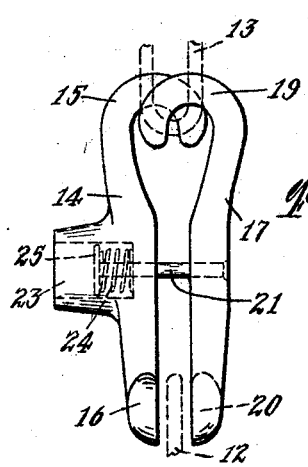

1,584,307

UNITED STATES PATENT OFFICE.

FRANK B. KING, OF WAKEFIELD, MASSACHUSETTS.

CHAIN HOOK.

Application filed September 17, 1925. Serial No. 56,849.

The object of this invention is to provide a simple, durable, and effective device adapted for use in connecting an anti-skid chain which extends across the tread of a motor vehicle wheel, with the anchoring chains which bear on opposite sides of the rim of the wheel and extend around the same.

Of the accompanying drawings forming a part of this specification.—

Figures 1 and 2 are side views, taken from different points, showing a securing device embodying the invention, engaged with a link of an anti-skid chain, and with a link of an anchoring chain.

Figure 3 is a section on line 3—3 of Figure 2.

Figure 4 is a view similar to Figure 2, illustrating the operation of engaging the device with an end link of an anti-skid chain.

Figure 5 is a view similar to Figure 1, illustrating the operation of engaging the device with a link of an anchoring chain.

The same reference characters indicate the same parts in all of the figures.

In the drawings, 12 designates a link of a continuous anchoring chain, which may be understood to be one of two chains located at opposite sides of the rim of a rubber-tired motor-vehicle wheel, each chain being continuous and forming a circle corresponding to the rim, so that the end links 13 of any desired number of anti-skid chains extending across the tread of the tire may be connected with the anchoring chains.

It will be understood that each anti-skid chain is of a length sufficient to enable it to extend from one side of the wheel rim, across the tire tread and to the opposite side of the wheel rim.

The securing device in which my invention is embodied is designed to connect the end links 13 of an anti-skid chain, with corresponding links 12 of two anchoring chains, there being two of these devices for each anti-skid chain, the devices being detachably engaged with the end links 13 of an anti-skid chain, and with suitable links 12 of two anchoring chains.

My improved securing device comprises an elongated member 14, having open hooks 15 and 16, at its opposite ends, arranged at right angles with each other, and an elongated member 17, having open hooks 19 and 20, at its opposite ends, also arranged at right angles with each other.

The device also comprises a hinge pintle 21, fixed at one end to the member 17, and a boss 22, formed on the member 14 and containing a cavity 23 into which the pintle 21 extends. The member 14 is slidable on the pintle 21, to separate it from the member 17, as shown by Figure 5, and is normally held in contact with the member 17, as shown by Figure 1, by a spring 24, interposed between an abutment formed by the inner end of the cavity 23 and a head 25 on the pintle.

To engage the device with a link 13, the members are turned to separate the hooks 15 and 19, as shown by Figure 4, so that the link may be inserted between the hooks 15 and 19, as indicated by dotted lines in Figure 4, and then engaged with said hooks, as indicated by dotted lines in Figures 1 and 2, by a suitable manipulation.

To engage the device with a link 12, the members are separated, as shown by Figure 5, so that the link may be inserted between the hooks 16 and 20, as indicated by dotted lines in Figure 5, and then engaged with said hooks, as indicated by dotted lines in Figures 1 and 2, by suitable manipulation.

The hooks 15 and 19 constitute an eye which is divisible by a swinging movement of the members, and the hooks 16 and 20 constitute an eye which is divisible by a sliding movement of the members, the eyes being in different planes, so that one is substantially at right angles to the other.

After the links are engaged with said divisible eyes, the members are held in close contact with each other by the spring, and the links prevent swinging movements of the members relative to each other.

I claim:

A securing device for anti-skid chains, comprising two elongated members each having open hooks at its opposite ends, a hinge pintle fixed to one of said members and slidable in the other member, and a spring interposed between a head on the pintle and an abutment on one member, and normally holding the members in contact with each other, the hooks forming eyes arranged in different planes, one eye being divisible by a swinging movement, and the other by a sliding movement.

In testimony whereof I have affixed my signature.

FRANK B. KING.